Dec. 9, 1958 G. R. P. MARIÉ 2,863,998

FREQUENCY CONVERTER COMPRISING RESONANT CAVITY HAVING THIN SUPRACONDUCTIVE WALLS AND DIRECT MAGNETIC FIELD

Filed Oct. 14, 1957 4 Sheets-Sheet 1

Dec. 9, 1958 G. R. P. MARIÉ 2,863,998

FREQUENCY CONVERTER COMPRISING RESONANT CAVITY HAVING THIN SUPRACONDUCTIVE WALLS AND DIRECT MAGNETIC FIELD

Filed Oct. 14, 1957 4 Sheets-Sheet 2

Dec. 9, 1958

G. R. P. MARIÉ

2,863,998

FREQUENCY CONVERTER COMPRISING RESONANT CAVITY HAVING THIN SUPRACONDUCTIVE WALLS AND DIRECT MAGNETIC FIELD

Filed Oct. 14, 1957

4 Sheets-Sheet 4

United States Patent Office 2,863,998

Patented Dec. 9, 1958

2,863,998

FREQUENCY CONVERTER COMPRISING RESONANT CAVITY HAVING THIN SUPRACONDUCTIVE WALLS AND DIRECT MAGNETIC FIELD

Georges Robert Pierre Marié, Paris, France

Application October 14, 1957, Serial No. 689,865

Claims priority, application France October 22, 1956

14 Claims. (Cl. 250—20)

Figure 1:
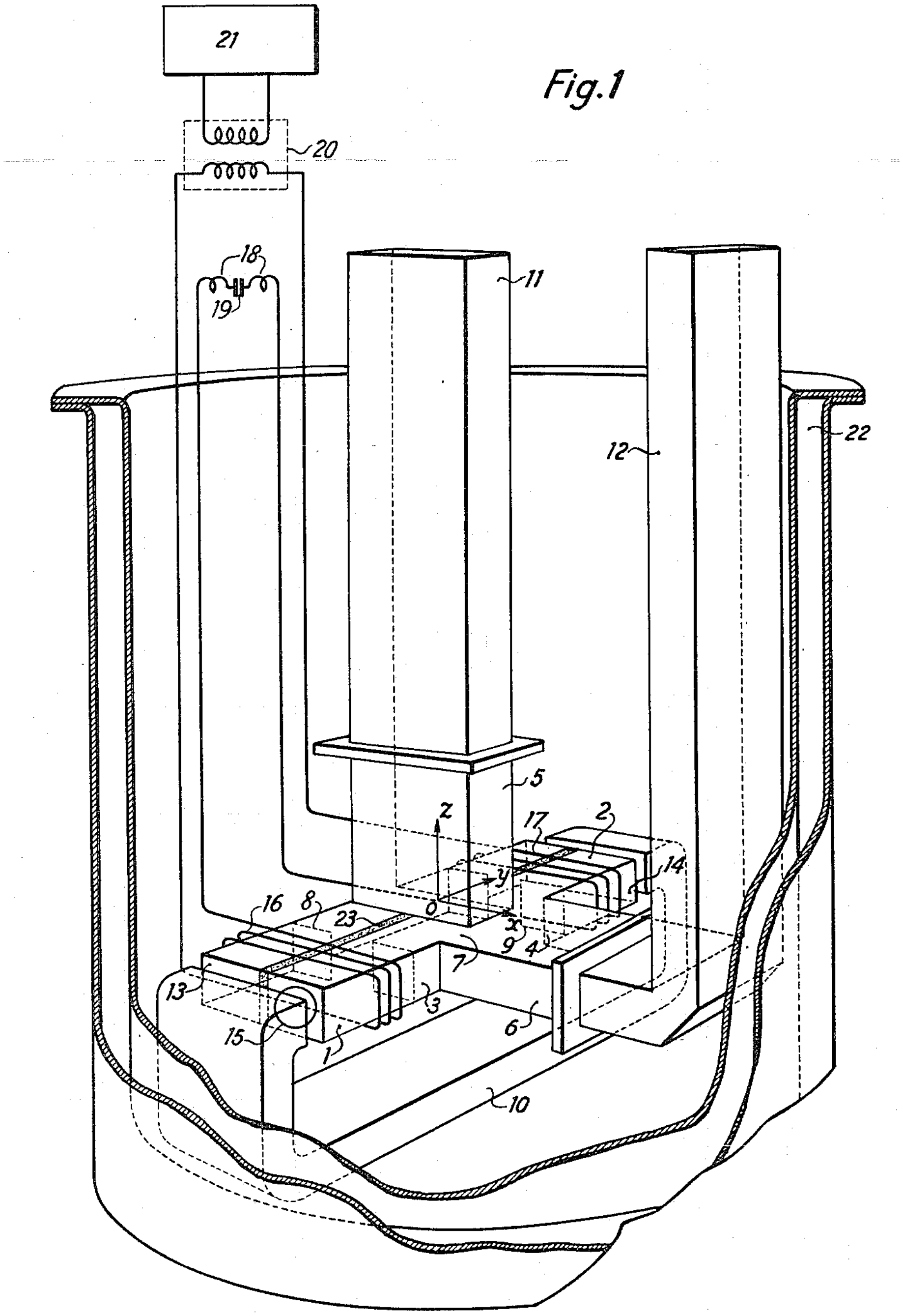

The present invention relates to receivers for the detection of electromagnetic waves in the centimeter and millimeter wave ranges, and more specifically, to frequency changers for such waves. Such frequency changers are capable of receiving very weak signals in the above-mentioned wave ranges and of generating, by the interfering of these signals with a local wave having a wavelength selected in the same ranges, an intermediate frequency signal with a wavelength in the meter of ten-meter range, which can be amplified by a conventional intermediate frequency amplifier.

A frequency changer of the invention is essentially characterized in that it comprises at least one resonant cavity with extremely thin metallic walls, made supraconductive by cooling means and thus maintained at a temperature near to absolute zero and submitted to a D. C. magnetic field perpendicular thereto, in which free electrons move along circular trajectories under the influence of the electromagnetic fields developed by the signal and the local wave in the cavity. The motion of the electrons along these trajectories generates in alternating magnetic field having a frequency equal to the frequency difference of the signal and the local wave and which is picked up by coupling means connected to the input of an intermediate frequency amplifier.

More precisely, in the walls of one or several resonant cavities, the signal and the local wave generate currents which alternately add and subtract, at a rhythm corresponding to the frequency difference of the signal and the local wave. The walls, which consist of metallic layers, the thickness of which hardly exceeds that of a monomolecular layer deposited on plates of dielectric material, are made supraconductive by immersion in a liquefied gas such as liquid helium, and are subjected to a very strong direct current magnetic field perpendicular thereto, which forces the free electrons in the metal to move along circular trajectories. Under these conditions, a variable magnetic field is obtained, the intensity of which depends on the amplitude of the high frequency currents and which consequently oscillates at a frequency equal to the difference of the frequencies of the signal and the local wave. This variable magnetic field induces, in a coupling loop inserted in a resonant circuit tuned to a meter wave, an electromotive force which is applied to the input of a conventional intermediate frequency amplifier.

Conventionally, the magnetic field associated with the circular trajectories of the free electrons and developed by the very high frequency currents which propagate in the supraconductive walls in the presence of a direct current magnetic field, will be called a "cyclonic magnetic field." The word "cyclonic" conveys that the electrons are submitted to an effect of the cyclotron type.

The apparatus of the invention has a signal-to-noise ratio definitely higher than that of other ultra-high frequency signal detector systems.

It is known that the background noise existing in detectors arises from the granular structure of electricity and thermal agitation. It should be pointed out that, when a phenomenon involves a very large number of electrons, its granular aspect is no longer observed. If energy from a very weak signal is distributed between a very high number of electrons, these electrons acquire but a very small velocity and it is impossible to detect a signal voltage. It is, therefore, advisable to avoid the use of devices having potential barriers (like those which exist in crystals or diodes); devices capable of working at zero impedance are preferred. Thus, magnetic effects must be used, which are the only ones able to make use of a very large number of electrons each of which has received a very low energy from the signal. These electrons, moving in a supraconductive metallic wall, have no thermal agitation, as they cannot receive it from the atomic nuclei, which are practically devoid of any such agitation.

Moreover, in order to enable a very weak signal to communicate to electrons as high an energy as possible and much higher than that due to the residual thermal agitation, the cyclotron effect is used, which means that interaction between the high frequency waves and the electrons occurs with the aid of a magnetic field to which corresponds a value of Larmor's frequency equal to that of the waves to be detected. Thus, the high frequency electromagnetic waves yield energy to the electrons over a fairly large number of periods at that frequency.

Figure 2:
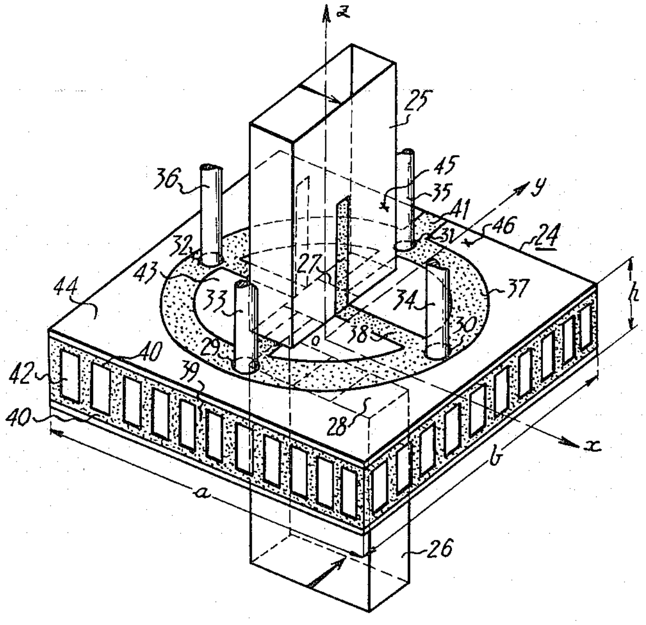
Figure 3:
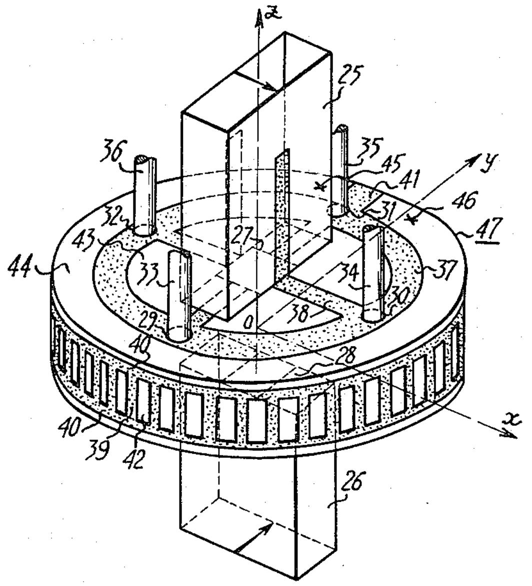
Figure 5:
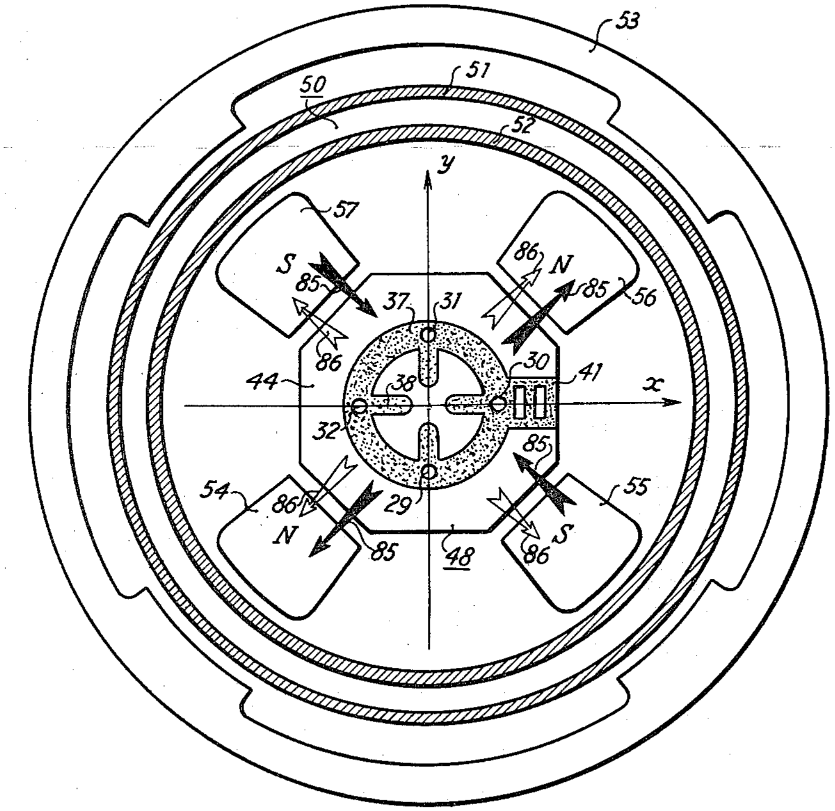
Figure 4:
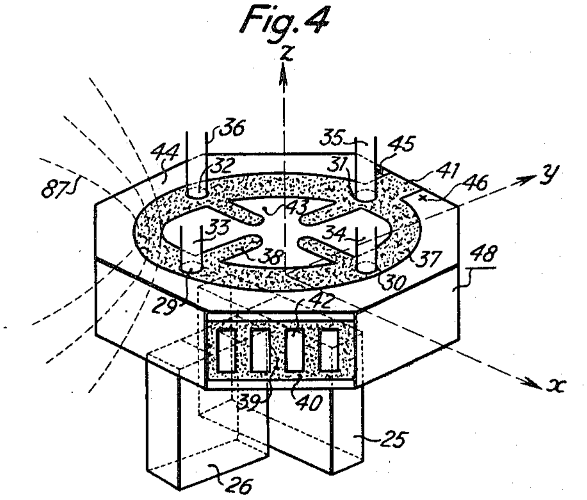
Figure 6:
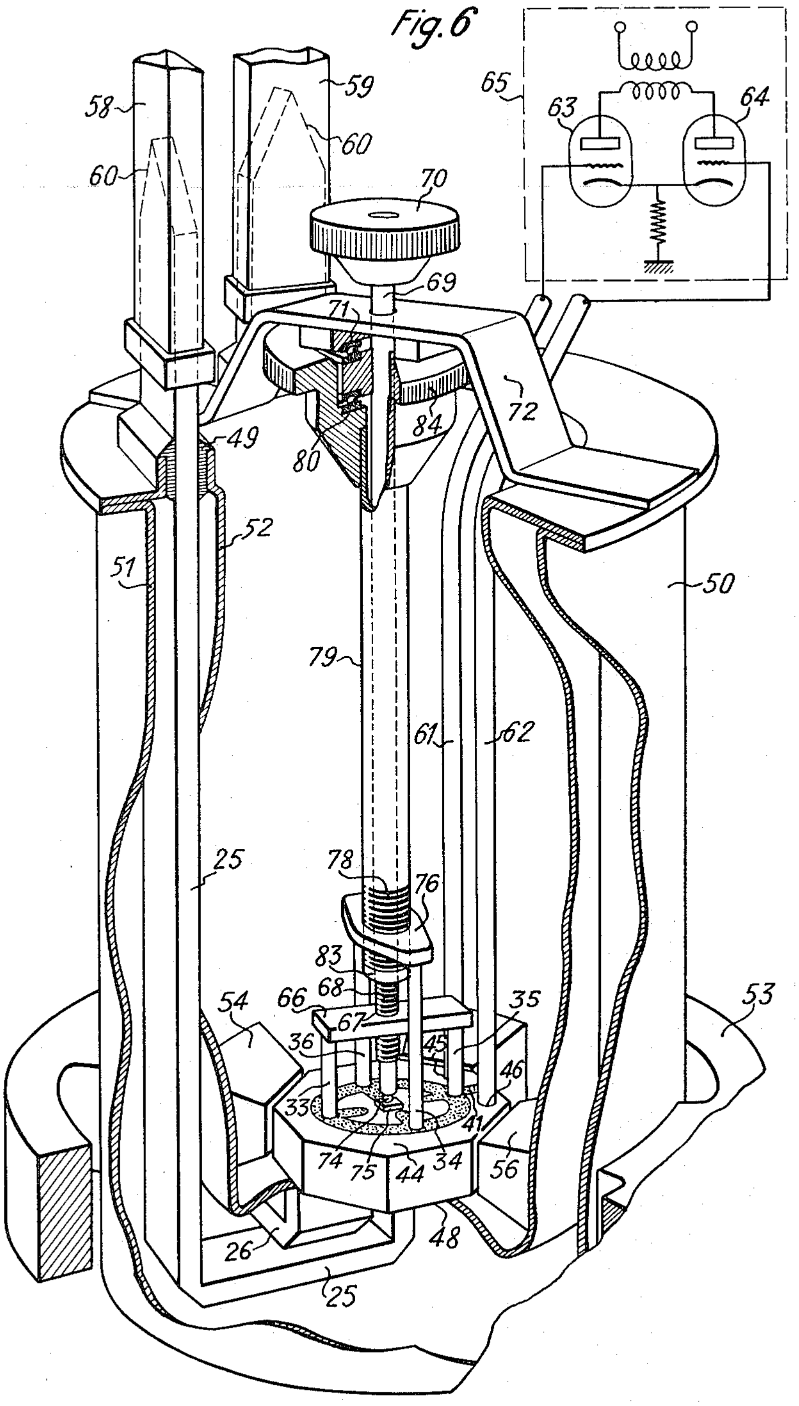

The invention will be better understood with the help of the following detailed description and of the annexed drawings, in which:

Fig. 1 represents a first type of receiver, including two resonant cavities, according to the invention;

Figures 2, 3 and 4 respectively represent parallelepipedic, cylindrical and prismatic cavities, the resonance of which is taken advantage of by the signal and the local wave, usable in a second receiver type, including a single cavity, according to the invention;

Figures 5 and 6 represent the said second receiver type.

Referring to Fig. 1, 1 and 2 designate two resonant cavities, tuned to the same frequency F, intermediate the signal frequency $F_1$ and the local wave frequency $F_2$. $F_1$ and $F_2$ are frequencies of the centimeter wave band or of the millimeter wave band. These two cavities are respectively coupled to the two co-linear branches 3 and 4 of a "magic tee" (hybrid wave guide junction) 7 through coupling irises 8 and 9. The cavities 1 and 2 and the irises 8 and 9 are symmetrical with respect to the plane containing the axes of the series and shunt branches of the magic tee.

A direct current magnetic field $H_0$, created by the magnet 10, is set up in the direction of the axis of the co-linear branches of the tee. The signal to be detected is applied to the frequency changer by the wave guide 11 connected, for instance, to the series branch 5 of the tee, and the local wave is introduced by the wave guide 12 connected to its shunt branch 6.

Cavities 1 and 2 are respectively surrounded by windings 16 and 17, which are inserted in a resonant circuit tuned to the intermediate frequency which can be, for instance, that of a meter wave, the main inductance of which can be seen at 18 and the condenser at 19. This resonant circuit is tuned to the frequency $(F_1-F_2)$. It is coupled through transformer 20 to an intermediate frequency amplifier 21.

The cavities, the tee, the magnet and the windings are immersed in a Dewar's vessel filled with liquid helium. However, the magnet could be outside of the vessel.

The signals and the local wave interfere in the tee. More precisely, if $u_1$ and $u_2$ are the respective amplitudes of the signal and the local wave at their inputs to the tee, the electromagnetic fields generated in cavities 1 and 2 have amplitudes proportional to:

$$\sqrt{\frac{u_1^2+u_2^2}{2}\pm u_1u_2\cos 2\pi(F_1-F_2)t}$$

with the plus sign for one of the cavities and the minus sign for the other; $t$ designates time.

The cavities are of such sizes that the direction of the electric field is parallel to O$z$ and that they resonate according to the $TE_{110}$ mode (for the direction of the coordinates O$x$, O$y$, O$z$ shown in Fig. 1). It results therefrom that the direction of the currents in the cavity walls parallel to O$z$ is itself parallel to O$z$. Under the action of the direct current magnetic field parallel to O$y$, the electrons existing in the walls 13 and 14 perpendicular to the direction O$y$ are deflected and, if the system is at a temperature near to absolute zero, their trajectories are only very slightly disturbed by the shocks on the atom nuclei and are circles. One of these circles is represented on a very enlarged scale at 15 in Fig. 1.

When the angular frequency $\omega$ of the high frequency electromagnetic waves equals Larmor's angular frequency corresponding to the value $H_0$ of the direct current magnetic field, i. e., when:

$$\omega=eH_0/m$$

where $e$ and $m$ are respectively the charge and the mass of an electron (see J. Larmor, Philosophical Magazine, 1897, 44, p. 503), resonance occurs. The electron trajectories in the walls are then circles, the diameter of which is much larger than the amplitude of the rectilinear oscillating movement, the said electrons would have if the magnetic field $H_0$ did not exist. The circular trajectories of the electrons in the walls generate a cyclonic magnetic field opposite to the direct current field $H_0$. The intensity of this magnetic field increases simultaneously with the electromagnetic energy in the resonant cavities.

The principle of the invention is to use the variations of the cyclonic magnetic field to detect the corresponding variations of the high frequency energy of the signal.

It is obvious that the thickness of the metallic walls of the resonant cavities must be equal to that of the pellicular layer of penetration of the wave into the metal. In fact, if things were otherwise, the variation of the magnetic field caused by the appearing or disappearing of the circular trajectories of the electrons in the penetration layer of the waves, would generate eddy currents in the deeper levels of the metal of the cavity walls, which currents would cancel the variations of the cyclonic magnetic field outside of the cavities.

The extremely thin metallic walls of the cavities are obtained by metallizing a dielectric material such as glass. It is possible either to assemble sheets of metallized dielectric around a free space which constitutes the cavity, or to provide a block of dielectric material, the outer walls of which are metallized and the form and size of which are those of the cavity volume. In the first case the waves resonate in a space portion, the electromagnetic constants of which are those of free space; in the second one, they resonate in a space portion, the electromagnetic constants of which are those of the used dielectric material.

In cavities 1 and 2 the cyclonic magnetic fields associated with the high frequency energy stored in the cavities vary at the same rhythm as the variations of this energy, i. e. at the frequency $(F_1-F_2)$. Both of these magnetic fields are directed opposite to the magnetic field $H_0$, but one of them is minimum when the other is maximum. Therefore, they are to be considered as the sum of a direct current component opposite to the magnetic field $H_0$ and of alternating components opposite in phase. These fields induce a current in the coils 16 and 17. These coupling coils are wound in such directions that the two corresponding cyclonic fields, though oscillating in opposite phases, induce currents having the same direction in the resonant circuit 18, 19.

In order to avoid that currents, the frequency of which corresponds to a wavelength in the meter range, turn around axis O$y$ in the cavity walls and thus cancel the influence of the cyclonic field in coils 16 and 17, the metallizing of the cavity wall must be interrupted near to the plane $y$O$z$, which is for both cavities a plane of symmetry parallel to the direction of the electric field. The cut 23 of the metallizing of the wall does not interrupt the high frequency currents which are everywhere parallel to this cut. Such a cut only suppresses the currents of meter wavelength which are perpendicular to its direction.

The two cavities of the receiver of Fig. 1 may also be replaced by a single cavity energized by the signals and the local wave according to two distinct modes which generate in the cavity walls currents which alternately add and subtract themselves. Such an embodiment of the invention is shown in Fig. 8.

Fig. 2 represents a parallelepipedic cavity 24 referred to a rectangular system of axes O$x$ $y$ $z$, the origin of which coincides with its center and the axes of which are parallel to its edges. The height $h$ of the cavity is smaller than the shorter of the wavelengths of the signals and of the local wave (these two quantities being very near to each other) and its length $a$ and width $b$ are comprised between one and two such wavelengths. It is assumed that the cavity is constituted by a block of externally metallized dielectric substance. Direct current magnetic fields are applied perpendicularly to the lateral walls of the cavity parallel to O$z$, by means not shown. Cavity 24 is coupled to two rectangular guides 25 and 26, through two irises 27 and 28. The guides 25 and 26 have their axes directed along O$z$. The longer side of guide 25 is parallel to O$y$ and that of guide 26 is parallel to O$x$. They respectively transmit the signals and the local wave according to the mode $TE_{10}$.

The $TE_{10}$ wave which enters through guide 25 has an electric field configuration symmetrical with respect to plane $x$O$z$ and asymmetrical with respect to plane $y$O$z$. The $TE_{10}$ wave which enters through guide 26 has a symmetrical electric field configuration with respect to plane $y$O$z$ and an asymmetrical configuration with respect to plane $x$O$z$. Taking in account these symmetries, the $TE_{10}$ wave entering through guide 25 cannot transfer any energy to guide 26 or conversely. In cavity 24, the wave coming from guide 25 is thus asymmetrical with respect to plane $y$O$z$ and symmetrical with respect to plane $x$O$z$. The dimensions of the cavity are chosen so that only a resonance according to the $TE_{210}$ mode be possible, as the electric field is directed along O$z$ and the plane where the electric field is constantly zero is the plane $y$O$z$. In the absence of a direct current magnetic field, the currents in the lateral faces of cavity 24 parallel to O$z$ are also parallel to O$z$ and, on the side of the negative $x$'s, are opposite in phase to those on the side of the positive $x$'s.

In a similar way and for the same reasons, the wave coming from guide 26 causes in cavity 24 a resonance according to the $TE_{210}$ mode, the electric field of which is parallel to O$z$, the plane where the electric field is constantly zero being the plane $x$O$z$. The currents in the walls parallel to O$z$ are parallel to O$z$ and, on the side of the negative $y$'s, are opposite in phase to those on the side of the positive $y$'s.

If $\epsilon$ and $\mu$ respectively denote the dielectric constant and magnetic permeability of the medium inside of the resonant cavity 24, the resonance wavelengths $\lambda_1$ and $\lambda_2$ for the $TE_{210}$ and $TE_{120}$ waves are given respectively by the relationships:

$$\epsilon\mu/\lambda_1^2=1/4a^2+1/b^2$$

$$\epsilon\mu/\lambda_2^{2\prime}=1/a^2+1/4b^2$$

The corresponding resonance frequencies $f_1$ and $f_2$ should be made equal to $F_1$ and $F_2$. For this purpose, there are provided, in the resonant cavity 24, four openings 29, 30, 31, 32 through which plungers of dielectric material 33, 34, 35, 36 may penetrate in an adjustable manner. The plungers 33 and 35, symmetrically set up with respect to O*z* and in the zero field plane *y*O*z* for the oscillation frequency $F_1$ of the $TE_{210}$ mode, are without influence on the resonance of this oscillation. On the other hand, they modify the frequency of the asymmetrical resonance with respect to *x*O*z*, i. e. of the $TE_{210}$ mode resonance, as they are in a region where the electric field is maximum. The plungers 33 and 35 thus allow to make $f_2$ equal to $F_2$. Similarly, it could be seen that plungers 34 and 36 allow to make $f_1$ equal to $F_1$. The means of adjusting the position of the plungers will be described in connection with Fig. 6.

Should the base of the resonant cavity 24 be a square one with its sides parallel to the axes or to the bisectrices of the angles formed by these axes, both resonance wavelengths of the $TE_{210}$ and $TE_{120}$ modes would be equal to:

$$\lambda=0.894a\sqrt{\epsilon\mu}$$

*a* being the length of the side of the square.

In order to properly direct the alternating currents of frequency corresponding to a meter wavelength induced by the cyclonic magnetic fields in the lateral walls of the cavity, the latter walls are cut by removing the superficial metallization at the proper places, in such a way that the high frequency currents are not too much disturbed.

The lower side of cavity 24 is entirely metallized, except, of course, over the slot of the iris 28. The upper side comprises a non-metallized circular zone 37 and non-metalized radial zones 38 inside the circular zone 37. The side walls comprise non-metallized zones in shape of strips 39 parallel to O*z* and in shape of the rim of a lid 40 perpendicular to O*z*. Finally, a non-metallized radial strip 41 is provided outside the circle 37. The non-metallized zones can be considered as slots in the metallic wall of the cavity. The slots 40 perpendicular to the natural current lines act as capacities. The metallic strips 42 situated between the slots parallel to the current lines act as inductances and both together act as a series resonant circuit, the reactance of which is substantially zero in a fairly wide frequency band. By experimental adjustment, this frequency band may be centered on the ultra-high frequency resonance of the cavity. The cut in the metallized wall of the cavity thus provided practically does not disturb the ultra-high frequency currents. On the other hand, the cut prevents the passing of the currents induced by the variations of the cyclonic magnetic field and properly directs the meter wavelength currents. As it will be seen later, when studying the field lines of the alternating component of the cyclonic field in the case of a cavity of the type of Fig. 4, it may be shown that the induced currents tend to turn around axis O*z*. This results from a study of the configuration of the cyclonic magnetic field, which will be made later on in connection with said Fig. 4. Therefore, the metallized part 43 in the central part of the upper side of the cavity is provided with radial slots 38 which prevent the meter wavelength currents from turning in this region and cause them to remain in the metallized zone 44 outside the circular slot 37, thus producing an alternating voltage of meter wavelength between points 45 and 46 situated on each side of the non-metallized strip 41.

The meter wave power which can be delievered between points 45 and 46 is twice that of the signals, if losses are neglected. In fact, if the local wave delivers a power equal to that of the signals, the ultra-high frequency currents which mutually interfere, periodically cancel each other and consequently the alternating component of the cyclonic field has an amplitude equal to that of its direct current component and the total power of both waves is collected as a meter wave.

By increasing the power of the local wave, the direct current component of the cyclonic field increases too, but not the amplitude of the alternating component resulting from the interference beats. The meter wave power is the same as before but with the disadvantage that the energy dissipated as heat is higher since the mean path covered by the electrons is longer and since it is then more difficult to maintain the condition of supraconductivity.

From the shape of the resonant electromagnetic fields in the cavity of Fig. 2, it results that if pellicular currents parallel to O*z* are excited in phase by the signals and the local wave in the quadrant where *x* and *y* are positive, they also are in phase in the quadrant where *x* and *y* are negative, but they are opposite in phase in the other two quadrants where *x* and *y* have opposite signs.

These properties of the pellicular currents are due to the fact that the resonant cavity is symmetrical with respect to two rectangular planes *x*O*z*, that its height measured along axis O*z* is lesser than half the wavelength, in order to eliminate the oscillation modes for which the electric field is not parallel to O*z*, and that it is energized by the two sources in an antisymmetric manner with respect to the two planes of geometric symmetry.

The above-mentioned properties remain unchanged if the just mentioned conditions are fulfilled. They remain valid, in particular in the case of the cylindrical cavity of Fig. 3 and in that of the prismatic cavity with an octagonal base of Fig. 4.

Referring now to Fig. 3, the resonant cavity 47 is cylindrical and has a height lesser than half the shorter wavelength of the signals and the local wave. Guide 25 leads to cavity 47 the signal energy which generates a $TE_{100}$ wave having its maximum electric field line directed along O*x*. Guide 26 leads to cavity 47 the energy of the local wave which generates a $TE_{110}$ wave having its maximum electric field line directed along O*y*. The cavity resonances are tuned to $F_1$ and $F_2$ by the action of plungers 33 and 36 which penetrate through the openings 29, 30, 31, 32 in the wall of the cavity. The reference numbers 37 to 46 have the same meaning as in Fig. 2. Direct current magnetic fields are applied perpendicularly to the walls of cavity 47 that are parallel to O*z*, by means not shown in Fig. 3.

If the resonant cavity 47 is a cylinder with a diameter D, its resonant wavelength is given by the relationship:

$$\lambda=0.8199D\sqrt{\epsilon\mu}$$

Referring to Fig. 4, the resonant cavity 48 is prismatic, and has a regular octagon base and its height is less than half the shorter of the wavelengths of the signals and the local wave. The two guides 25 and 26 have their longer sides oriented at right angles, but they are both coupled to the lower side of the cavity. The oscillation modes in the cavity are not defined by known formulae, but it is obvious that the electromagnetic fields at resonance are very similar to those in the cylindrical cavity 47 of Fig. 3 and that their configurations tend towards those in the parallelepipedic cavity 24 of Fig. 2, if the octagon is transformed into a rectangle by moving away from the center the sides not parallel to the planes of geometric symmetry of the guides until the length of these sides becomes zero. The cavity resonances are tuned to $F_1$ and $F_2$ with the aid of plungers 33 and 36. The reference numbers in Fig. 4 have the same meaning as in Fig. 2.

Figures 5 and 6 represent a frequency changer with a single cavity, according to the invention. It comprises a Dewar's vessel 50 with a double wall 51 to 52, which contains in its lower part liquid helium or any other liquefied gas kept at a temperature near to absolute zero. A circular magnet 53 having four pole-pieces 54 to 57 is arranged around the lower part of the vessel. This magnet is made of an insulating ferro-magnetic material such as a ferrite, in order to avoid that eddy currents be generated in the magnet by the cyclonic magnetic field. The pole-pieces are interrupted where they pass through the walls of the vessel and are provided with extensions inside the vessel. This arrangement is not the only possible one, but it allows the use of a Dewar's vessel of not too large a diameter and the keeping of the coils of the magnet outside the vessel if an electromagnet is employed.

An octagonal resonant cavity 48 of the type of Fig. 4 is located at the bottom of the Dewar's vessel. This cavity 48 and the guides 25 and 26, which transmit the energies of the signals and of the local wave, are made of a dielectric material metallized on its surface, except at the slots of the cavity, as has been explained in connection with Figures 2 to 4. The guides 25 and 26 are twice bent at a right angle in their parts near to the cavity; they pass through the two walls 51 and 52 of the Dewar's vessel and issue at the top through an aperture made tight by a cement stopper 49, thus maintaining the vacuum which must exist between these two walls. Each of the guides 25 and 26 enters then into metal guides 58 and 59, respectively connected to the outer metallization of the metallized guides 25 and 26. According to a well-known technique, the purpose of which is to avoid any sudden change in characteristic impedance, the inner dielectric material of guides 25 and 26 ends with a tapered part 60 penetrating into the metal guides 58 and 59. Guide 25 is connected to a receiving antenna, and guide 26 to a local oscillator, both not shown on Fig. 6.

The four-pole magnet 53 creates a direct current magnetic field (Fig. 5) directed towards the center of cavity 48 in the quadrants where $x$ and $y$ have the same algebraic signs and directed towards its outside in the quadrants where $x$ and $y$ have opposite signs.

It has been shown above that the cyclonic magnetic field is directed opposite to the direct current field and that it is maximum in the quadrants where $x$ and $y$ have the same sign and minimum in the quadrants where $x$ and $y$ have opposite signs, or conversely. This cyclonic field can be considered as the sum of a direct current field and an alternating field. The constant part of the cyclonic field is represented in Fig. 5 by four identical black arrows with directions opposite to the direct current magnetic field.

The alternating cyclonic field is represented by four white arrows 86. When the whole cyclonic field is maximum in the quadrants where $x$ and $y$ have the same sign and minimum in the quadrants where $x$ and $y$ have opposite signs, the white arrows have the same direction as the black ones in the two first quadrants and opposite directions in the last two quadrants, as indicated in Fig. 5. The alternating component of the cyclonic field is every where directed towards the outside of the cavity. When the total cyclonic field is minimum in the regions where $x$ and $y$ have the same sign, the alternating component is everywhere directed towards the inside of the cavity. It results therefrom that all the field lines pertaining to the alternating component of toroidal cyclonic field closely resemble meridian curves of surfaces having $Oz$ as their axis (curves 87 of Fig. 4). The variations of this alternating magnetic field generate an electromotive force which tends to cause currents to turn around the periphery of the octagonal faces of cavity 48.

A two-wire line, the conductors 61—62 which consist of a metallic coating on a dielectric core made of a material with a low thermal conductivity, is connected on one hand to points 45 and 46 on the upper surface of cavity 48 and on the other hand to the control grids of the two electron tubes 63 and 64 of the intermediate frequency amplifier 65. As the meter wave energy is delivered between points 45 and 46 as it would be from a source of very low impedance, the two-wire line 61—62 must have a length approximately a quarter-wave-length for the intermediate frequency. In fact, its length should be slightly lesser than a quarter-wave, as it must form a tuned circuit with the metallized zone 44, in the shape of a loop, which collects the meter wave signal, taking due account of the input capacitance of tubes 63 and 64.

The system 48 which permits simultaneous tuning of the cavity of the resonance frequencies $F_1$ and $F_2$, comprises a double set of dielectric plunger pistons 33—35 and 34—36. Plungers 33 and 35, both located in plane $yOz$, are held in position by a movable member 66 which carries a nut 67 engaging with a thread 68 on the end portion of an insulating control rod 69. This rod is set up axially in the Dewar's vessel and is provided at its upper end with a milled knob 70. The rod 69 is guided at its upper part by a ball-bearing 71 held in position by a spring 72 secured to the Dewar's vessel and at its lowest part by a thrust-ball 74 rigidly secured to a dielectric plate resting on the upper side of cavity 48. Plungers 33 and 35 allow the adjustment of the resonance frequency for the $TE_{120}$ wave to the value $F_2$.

Plungers 34 and 36, both located in plane $xOz$, are held in position by a movable member 76 carrying a nut 77 screwed on the screw 78 at the end of a hollow insulating control rod 79, having the same axis as rod 69. This rod is guided at its upper part by a ball-bearing 80 held in position by the spring 72 secured to the Dewar's vessel, while at its lower part it hinges on the shouldering 83 of rod 69. Rod 79 is provided at its upper end with a milled knob 84. Plungers 34 and 36 allow the adjustment of the resonance frequency of the $TE_{210}$ wave to the value $F_1$.

What is claimed is:

1. A frequency changer for receiving ultra-high frequency signals of a given frequency, comprising a plurality of resonant cavities at least a part of the walls of which are very thin, cooling means for keeping the walls at a temperature near absolute zero to make the same supraconductive, means for creating constant magnetic fields perpendicular to said part of said walls, first coupling means for introducing the energy of said signals into said cavities, second coupling means for introducing the energy of a local ultra-high frequency wave having a frequency different from said given frequency into said cavities, and third coupling means inductively coupled to said part of said walls and receiving an alternating electromotive force having a frequency equal to the difference of the frequencies of said signals and local wave.

2. A frequency changer as claimed in claim 1, wherein said means for creating said magnetic fields comprises at least one permanent magnet.

3. A frequency changer as claimed in claim 1, wherein said part of said walls comprises an insulting material and a thin metal layer thereupon.

4. A frequency changer as claimed in claim 1, comprising first and second parallelepipedic resonant cavities both tuned to a frequency intermediate those of said signals and local wave and a magic tee junction having co-linear branches which are respectively coupled to said first and second cavities, wherein said first and second coupling means are respectively coupled to the two other branches of said magic tee junction, and wherein said third coupling means comprises coils positioned around said co-linear branches of said magic tee junction.

5. A frequency changer as claimed in claim 4, comprising an intermediate frequency amplifier and wherein said coils are coupled to the input terminals of said intermediate frequency amplifier.

6. A frequency changer for receiving ultra-high frequency signals of a given frequency, comprising a resonant cavity at least a part of the walls of which are very thin, cooling means for keeping the walls at a temperature near absolute zero for rendering the same supraconductive, means for creating constant magnetic fields perpendicular to said part of said walls, first coupling means for introducing the energy of said signals into said cavity, second coupling means for introducing the energy of a local ultrahigh frequency wave having a frequency different from said given frequency into said cavity, and third coupling means inductively coupled to said part of said walls and receiving an alternating electromotive force having a frequency equal to the difference of the frequencies of said signals and local wave.

7. A frequency changer as claimed in claim 6, wherein said means for creating said magnetic fields comprises at least one permanent magnet.

8. A frequency changer as claimed in claim 6, wherein said part of said walls comprises an insulating material and a thin metal layer thereupon.

9. A frequency changer as claimed in claim 6, wherein said resonant cavity has the shape of a volume having two planes of symmetry intersecting along an axis, two plane faces perpendicular to said axis, and lateral faces parallel to said axis, the length of said cavity parallel to said axis being less than half the shorter of the wavelengths of said signals and local wave, wherein said first and second coupling means respectively consist of first and second rectangular wave guides both coupled to said cavity by openings provided in at least one of said plane faces, the longer sides of the cross-section of one of said guides being perpendicular to the longer sides of the cross-section of the other of said guides, wherein said cavity is provided with first and second tuning means for tuning it to the frequencies of said signals and local wave respectively for two distinct oscillation modes, the electric fields of which are perpendicular one to the other, wherein said constant magnetic fields are perpendicular to said lateral faces, and wherein said third coupling means consists of a conducting loop, the plane of which is perpendicular to said axis.

10. A frequency changer as claimed in claim 9, wherein said first and second tuning means respectively comprise first and second pairs of movable plunger pistons of a dielectric material and respectively penetrating into said cavity in the vicinity of each one of said planes of symmetry.

11. A frequency changer as claimed in claim 9, wherein said single cavity has a parallelepipedic shape, wherein said modes are respectively the $TE_{210}$ and the $TE_{120}$ modes, and wherein said planes of symmetry are planes perpendicular to the sides of said rectangular cross-section and passing through the middle point of said sides.

12. A frequency changer as claimed in claim 9, wherein said single cavity has the shape of a circular cylinder and wherein the two said modes are both $TE_{110}$ modes with their directions of maximum electric field perpendicular one to the other.

13. A frequency changer as claimed in claim 9, wherein said single cavity has a prismatic shape with an octagonal cross-section and wherein one-half of said lateral faces of said cavity are submitted to constant magnetic fields, said one-half of said lateral faces comprising only non-adjacent faces.

14. A frequency changer as claimed in claim 9, wherein said conducting loop is connected to the input of an intermediate frequency amplifier.

No references cited.